United States Patent
Gysi

(10) Patent No.: US 6,588,648 B1
(45) Date of Patent: Jul. 8, 2003

(54) METHOD AND DEVICE FOR TRANSFERRING A HOLLOW-PROFILE BLANK

(75) Inventor: Peter Gysi, Bellikon (CH)

(73) Assignee: Elpatronic AG, Bergdietikon (CH)

( * ) Notice: Subject to any disclaimer, the term of this patent is extended or adjusted under 35 U.S.C. 154(b) by 0 days.

(21) Appl. No.: 09/623,433

(22) PCT Filed: Feb. 26, 1999

(86) PCT No.: PCT/CH99/00088

§ 371 (c)(1), (2), (4) Date: Dec. 15, 2000

(87) PCT Pub. No.: WO99/44783

PCT Pub. Date: Sep. 10, 1999

(30) Foreign Application Priority Data

Mar. 3, 1998 (CH) ................................. 505/98

(51) Int. Cl.⁷ .................... B23K 5/22; B23K 37/00; B23K 31/02; B21D 21/00
(52) U.S. Cl. ................. 228/212; 228/17.5; 228/173.5; 228/141.1; 228/164; 228/171; 219/61.3; 219/61.11; 219/61.13
(58) Field of Search .................. 228/212, 47, 49, 228/17.5, 135, 141.1, 144–151, 164, 171, 173.1; 29/493, 783, 732, 430; 219/64, 61.3, 61.11, 61.13; 156/73.5

(56) References Cited

U.S. PATENT DOCUMENTS

| | | | |
|---|---|---|---|
| 2,607,310 A | | 8/1952 | Evans |
| 3,745,641 A | * | 7/1973 | Paolini ........................ 156/73.5 |
| 3,829,959 A | * | 8/1974 | Oeckl .......................... 29/471.1 |
| 3,934,324 A | * | 1/1976 | Hess et al. ................... 228/125 |
| 4,190,186 A | * | 2/1980 | Flowers et al. ............. 219/105 |
| 4,497,995 A | * | 2/1985 | Nilsen ....................... 219/121.63 |
| 4,574,176 A | * | 3/1986 | Sharp ........................ 219/121.13 |
| 4,713,519 A | * | 12/1987 | Bersch et al. ............ 219/121.6 |
| 4,799,585 A | * | 1/1989 | Gysi ............................. 198/743 |
| 4,800,250 A | | 1/1989 | Watanabe ................ 219/121.63 |
| 4,815,673 A | * | 3/1989 | Wheeler ...................... 242/7.09 |
| 4,824,007 A | * | 4/1989 | Depaoli et al. .............. 219/61.3 |
| 4,839,496 A | | 6/1989 | Armier et al. |
| 4,894,908 A | * | 1/1990 | Haba, Jr. et al. ............... 29/711 |
| 4,905,885 A | * | 3/1990 | Hellman, Sr. ............. 219/61.11 |
| 4,996,765 A | * | 3/1991 | Maruyama et al. ........... 29/795 |
| 5,140,123 A | | 8/1992 | Mitani ........................ 219/61.2 |
| 5,395,103 A | * | 3/1995 | Gysi et al. ...................... 271/11 |
| 5,497,935 A | * | 3/1996 | Gravier ....................... 228/151 |
| 5,658,473 A | * | 8/1997 | Ziemek .................. 219/121.64 |
| 5,865,054 A | * | 2/1999 | Roper ......................... 29/421.1 |
| 5,926,967 A | * | 7/1999 | Johnson et al. ................ 33/645 |

FOREIGN PATENT DOCUMENTS

| | | | |
|---|---|---|---|
| DE | 8713471.3 | 10/1987 | |
| EP | 0672496 A2 | 9/1991 | |
| JP | 62-179191 | 11/1987 | .......... B23K/31/06 |
| JP | 4-178214 | 6/1992 | .......... B21C/37/08 |
| JP | 7-323381 | 12/1995 | .......... B23K/26/00 |
| JP | 10-6038 | 1/1998 | .......... B23K/20/00 |

\* cited by examiner

Primary Examiner—Tom Dunn
Assistant Examiner—L. Edmondson
(74) Attorney, Agent, or Firm—McCormick, Paulding & Huber LLP

(57) ABSTRACT

During manufacture of certain hollow profiles suitable for use in car body construction the welded profiles are subjected to a further deformation process, namely hydroforming. At present the corresponding welding machines are charged manually. The invention relates to a method and a device for transferring hollow-profile blanks, characterized in that during transfer the positioned fusion faces of the blanks are pressed against each other at least in the area of the weld.

13 Claims, 4 Drawing Sheets

METHOD AND DEVICE FOR TRANSFERRING A HOLLOW-PROFILE BLANK

BACKGROUND

The present invention relates to a method and an apparatus for transfer of preformed hollow sections which are to be welded.

Methods and apparatus for the fabrication of welded tubes or other hollow sections have long been known to the expert. Fundamentally in all these methods or apparatus a flat metal sheet is shaped into a section with the desired profile by means of a forming machine. This may involve drawing the flat sheet from a coil and shaping it into a straight-sided or round hollow section by means of a continuous forming process. In other forming machines the flat sheet is drawn from a stack and is shaped into the desired profile step-by-step by means of forming tools. The hollow sections thus preformed are then fed to a welding machine for welding of the butt joint formed by the edges of the sheet.

In the fabrication of hollow sections suitable for use in motor vehicle bodies, the welded sections are subjected to a further forming process. For this forming process, the hydro-forming technique is nowadays increasingly employed. This forming technique makes it possible to bend and/or bulge-form given sections as desired, but it imposes more demanding requirements on the quality of the welded joint.

Welding machines that are capable of meeting these more demanding quality-requirements are likewise known to the expert. These machines feature (inter alia) special devices for stabilizing the joint in the preformed parts and feeding it to the laser welding beam with the necessary precision.

In these precision high-power laser welding machines, transfer of the preformed hollow sections is manual. Firstly, this makes it possible to accommodate to the different processing rates of the individual forming machine and the welding machine used. Secondly, the precision welding machine is decoupled from the vibrations produced by the forming tools.

DE-U 8713471 discloses a welding machine for tubes in which a feeler roller engages in the joint between the edges to be welded in order to track the position of the laser beam. EP-A 0672496 discloses a laser processing plant for laser welding flanges to tubes and for cutting openings in the tube walls. U.S. Pat. No. 2,607,310 discloses a workpiece holder for arc welding of tubes.

SUMMARY OF THE INVENTION

A problem that can be addressed by the present invention, therefore, is to provide a mechanized transfer of preformed hollow-section blanks between hollow-section machine-tools and precision welding machines that allows preformed parts to be fed into a precision high-power laser welding machine in a time-optimized and vibration-free manner and with the necessary accuracy, so that they can be welded to yield hollow sections suitable for further forming into motor vehicle body components.

This problem is solved by a method in which the blank is seized by a transfer apparatus adapted to remove it from the forming tool and feed it to the welding machine, and is adjusted thereby so that the joint of the blank is in line with the welding point of the welding machine.

In a further process step the edges to be joined are positioned as desired and are presented together at least in the region of the welding point.

An apparatus according to the invention can include an apparatus which has means for seizing the preformed hollow-section blank that are adapted to remove the blank from the forming tool and feed it to the welding machine. By the same means, the joint of the blank can be adjusted so that it is in line with the welding point of the welding machine. Additional means are provided for positioning the joint edges as desired and for pressing the positioned joint edges together at least in the region of the welding point.

Particular embodiments are defined by the features of the dependent claims.

Developments of this method and of this apparatus lie within the skill of the expert, and fall especially into the category of additional measures for monitoring the welding process and controlling the quality of the welded seam. It will be evident that the welding machine can also be provided with a welding beam that is traversable along the joint, and that a weld seam cleaning operation following after the welding operation can be provided. For this transfer method according to the invention and its transfer apparatus, it is of course possible to use welding machines that are not subject to any special requirements as regards precision.

BRIEF DESCRIPTION OF THE DRAWINGS

The invention will now be described in detail with the aid of the figures and with reference to embodiments given by way of example.

DETAILED DESCRIPTION OF THE PREFERRED EMBODIMENTS

Figure 1:
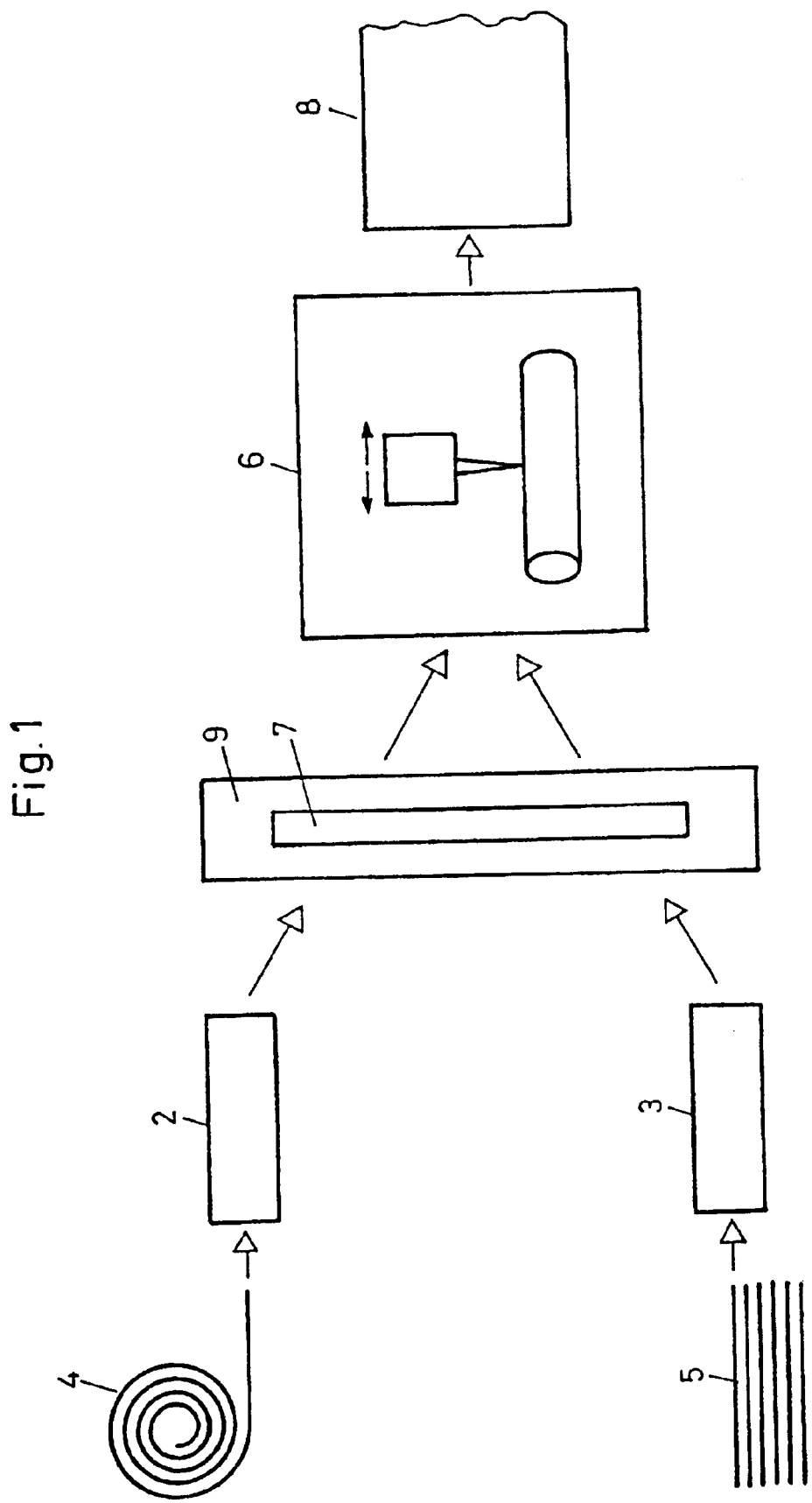
FIG. 1 is a schematic overview of the process for the fabrication of hollow sections.

As is clear from the fabrication process schematically shown in FIG. 1, either forming tools 2 which operate continuously or forming tools 3 which operate step by step can be used for forming the hollow sections. In the case of the continuously operating forming tools 2, the flat metal sheet to be formed is drawn directly from a coil 4; whilst in the case of the forming tools 3 which operate step by step, the flat sheets to be processed are removed from a stack 5. Such forming tools are known, and utilize the techniques of die bending, form bending by a sliding-action draw, or rolling. Hollow-section blanks of any desired shape, i.e. round, straight-sided or profiled, can be formed by these techniques. These hollow-section blanks have a joint running in their longitudinal direction which has to be welded in a further fabrication stage. For this purpose the hollow-section blanks which have been preformed by the forming tools are fed to a welding machine 6. Because the processing rates of the individual machines vary greatly, interim storage 7 is provided between the forming tools 2 and 3 and the welding machine 6, and the blanks are fed to the welding machine 6 manually. Known welding machines, especially for tube fabrication, are equipped with means for guiding the joint through the welding point. In subsequent processing stages 8 the welded tubes undergo further forming as desired, i.e. they are bent [or] expanded, [and/or are] provided with coatings, etc. The production diagram shown in FIG. 1 makes the solution to the problem of the present invention clear. The method according to the invention is concerned with the time-optimized, vibration-free and adjustable transfer 9, and is suitable for use in conjunction with forming tools 2 that operate continuously or step by step.

Figure 2:
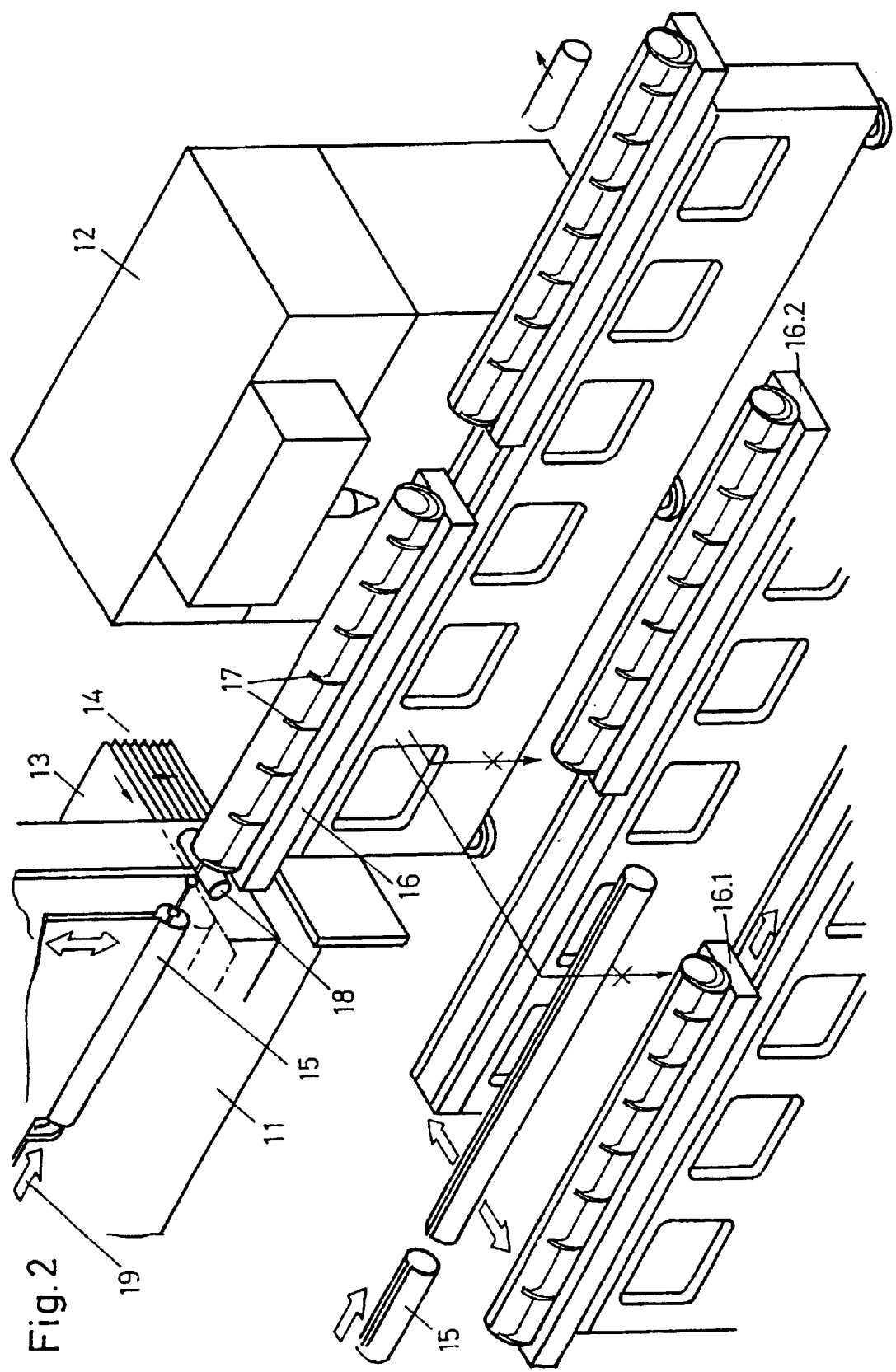
FIG. 2 shows a first variant of a transfer apparatus according to the invention, with a welding carriage.

A first embodiment is shown in FIG. 2. In this embodiment the forming tool 11 and the welding machine 12 are separated to prevent transmission of vibrations produced by the forming tool 11 to the welding machine 12. In this example the flat metal sheets 13 to be formed are drawn from a stack 14 and bent into a tube 15 by the forming tool 11 in a known manner. The preformed tube-blank is mechanically ejected 19 and loaded over rollers 18 on to a welding carriage 16. In a preferred form of this embodiment, two welding carriages 16.1, 16.2 running alternately forward and back are provided, and the welding beam X is directed alternately over one or other of the welding carriages. The welding carriage 16 has a large number of claws 17 by means of which the blank can be clasped, aligned, and locally pressed together. Such welding carriages are particularly suitable for handling blanks with a diameter of 50 to 250 mm. The thickness of the sheet metal varies between 0.5 and 3 mm.

Figure 3:
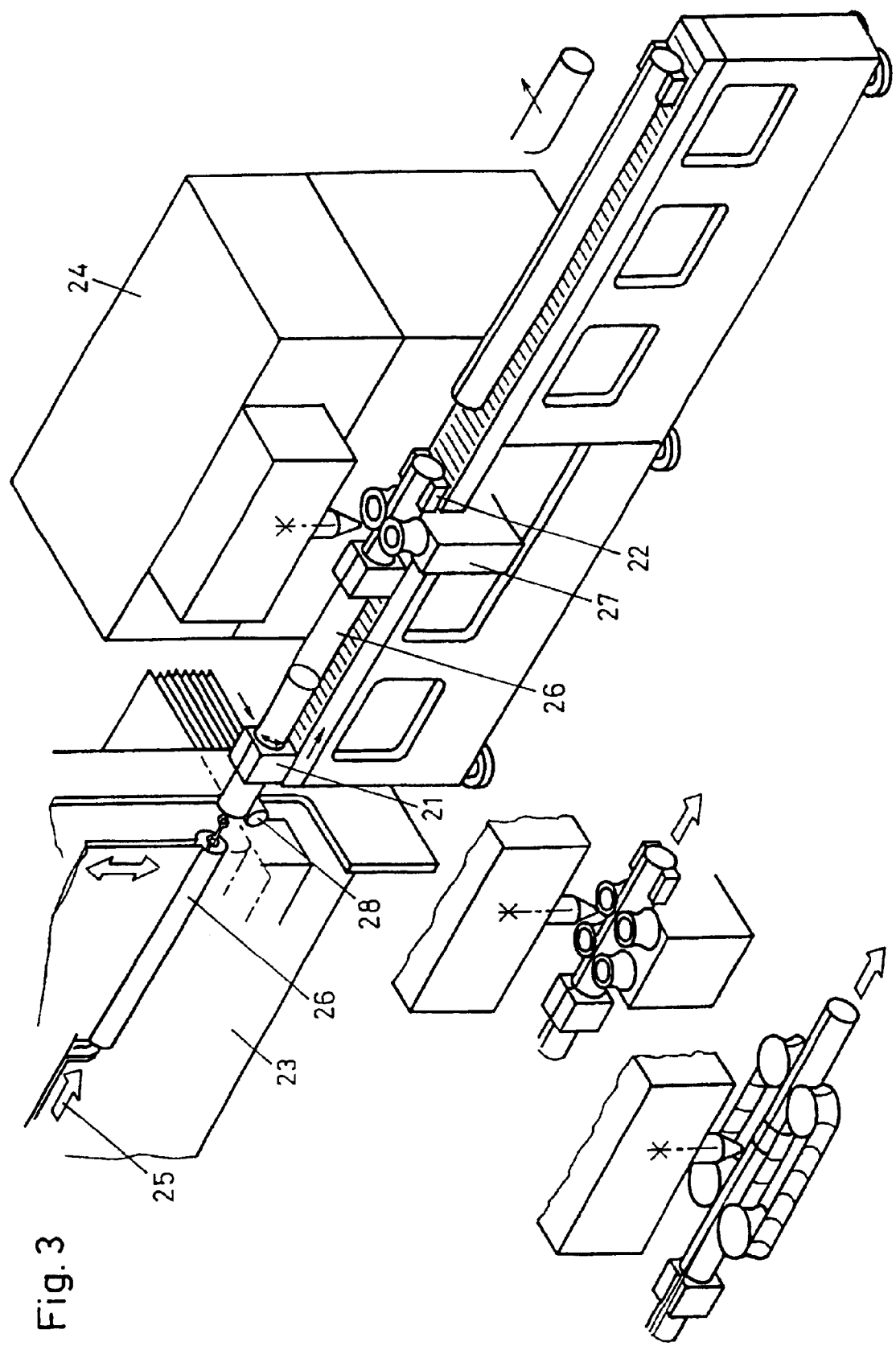
FIG. 3 shows a second variant of a transfer apparatus according to the invention, with a double shuttle.

The transfer apparatus shown in FIG. 3 has a loading shuttle 21 and an unloading shuttle 22. Here again the forming tool 23 and the welding machine 24 are separated to prevent transmission of vibrations from the forming tool 23. An ejector mechanism 25 of the forming tool 23 feeds the preformed blank 26 over rollers 28 to the loading shuttle 21, which in a first approximation aligns the joint to bring it in line with the welding point. For this purpose the shuttle is capable of turning the blank 26 about its longitudinal axis and of displacing it horizontally and/or vertically. This loading shuttle 21 leads the aligned (adjusted) blank 26 to the welding beam X of the welding machine 24. A further clamping mechanism 27 which stabilizes the joint and presses it together as desired is provided in the region of the welding point. This clamping mechanism 27 ensures in particular that the groove to be welded is guided precisely through the welding point. The unloading shuttle 22 serves to remove the welded blank 26 from the welding machine 24, and co-operates suitably with the loading shuttle 21. In particular, the loading shuttle 21 can seize the blank supplied by the forming tool 23 as the blank located in the welding machine 24 is being drawn through the welding machine by the unloading shuttle 22. Thus the welding machine 24 is able to operate without any significant interruptions. In this arrangement also, transfer between the forming tool 23 and the welding machine 24 is vibration-free, and handling is adjustable. 5

Figure 4:
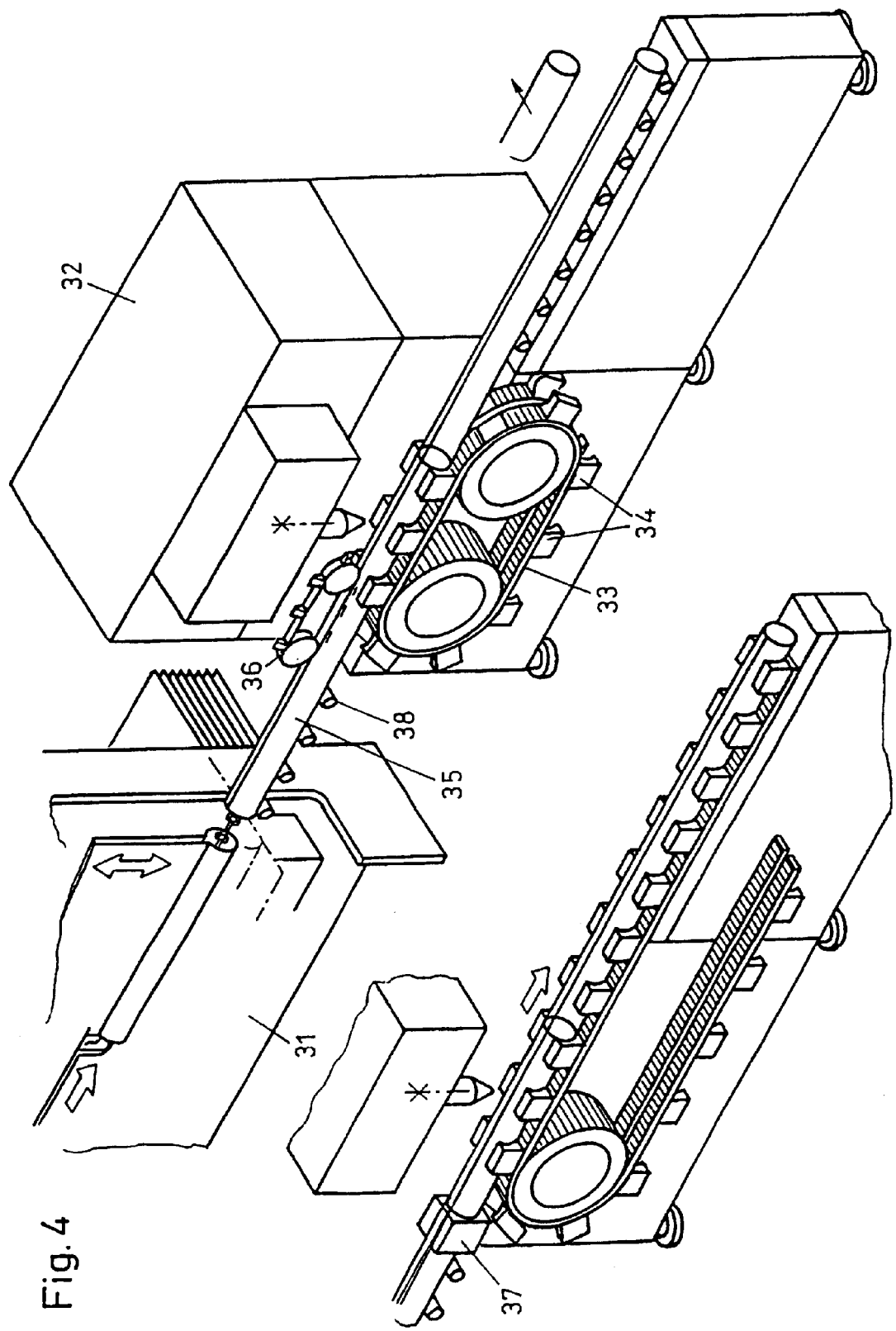
FIG. 4 shows a third variant of a transfer apparatus according to the invention, with a throughfeed system.

In the arrangement shown in FIG. 4, transfer between the forming tool 31 and the welding machine 32 is effected with the aid of caterpillar conveyors 33. These caterpillar conveyors 33 are fitted with gripping jaws 34, arranged in pairs, into which the blanks conveyed from the forming tool 31 are pushed. Through suitable configuration of the gripping jaws 34 or tilting on the individual caterpillars, the gripping jaws 34 are made to excess, a corresponding clamping force on the blank 35. The necessary alignment of the joint to be welded prior to its treatment at the welding point can be made by a co-travelling centring caterpillar 36 and/or a suitable loading shuttle 37. It will be obvious that this transfer system is suitable for transferring blanks from a continuously operating forming tool or from a forming tool operating in steps. In either case, the blanks ejected from the forming tool are fed over transfer rollers 38 to the gripping jaws 24 of the caterpillars 33.

It will be apparent to one of ordinary skill, in light of the disclosure herein, that the actions of the ejector mechanisms of the forming tools can be synchronized with those of the transfer apparatus. In particular, the welding machine can be operated in a duplex setup, i.e. one in which several transfer apparatuses are arranged parallel with each other and co-operate alternately with the welding beam of the welding machine. What type of high-power laser is used in the welding machine will depend on the material of the blank to be welded.

What is claimed is:

1. Method for the transfer of a hollow-section blank preformed in a forming tool and with a joint for welding, to the welding point of a welding machine suitable for the fabrication of hollow sections usable in motor vehicle construction, wherein the blank is seized by a transfer apparatus configured to unload the forming tool and to load the welding machine, the joint in the blank is aligned by means of the transfer apparatus so that the joint is in line with the welding point of the welding machine, the edges of the joint are positioned as desired, and the positioned joint-edges are pressed together at least in the region of the welding point, and wherein the transfer apparatus takes over the hollow-section blank by means of rollers to a clamping caterpillar of the transfer apparatus which is provided with several gripping jaws arranged in pairs, and wherein the alignment is made by one of a centering caterpillar arranged above the clamping caterpillar and before the welding point to co-travel with the hollow-section blank, and a loading shuttle arranged between the rollers and the clamping caterpillar.

2. Method according to claim 1, wherein the joint and the welding point are aligned with one another with the accuracy necessary for precision high-power lasers.

3. Transfer apparatus for the transfer of a hollow-section blank preformed in a forming tool and with a joint for welding, to the welding point of a welding machine suitable for the fabrication of hollow sections usable in motor vehicle construction, wherein the transfer apparatus has means for seizing the preformed hollow-section blank, which means are configured to unload the hollow-section blank from the forming tool and to load the hollow-section blank into the welding machine, means for positioning the edges of the joint as desired, means for pressing the positioned joint-edges together at least in the region of the welding point, wherein the means for seizing are provided by a clamping caterpillar having a plurality of gripping jaws and rollers which are arranged for leading the hollow-section blanks to the gripping jaws, and wherein the means for aligning are provided by one of a centering caterpillar arranged before the welding point above the clamping caterpillar for co-travelling with the hollow-section blank, and a loading shuttle arranged between the rollers and the clamping caterpillar.

4. Transfer apparatus according to claim 3, wherein the means for seizing and loading are traversable along a linear path.

5. Transfer apparatus according to claim 3 wherein the welding machine has a precision high-power laser.

6. Transfer apparatus according to claim 3 including a welding carriage.

7. Transfer apparatus according to claim 6, wherein the welding carriage has a plurality of individually operable claws.

8. Transfer apparatus according to claim 3 including at least two shuttles.

9. Transfer apparatus according to claim 4 wherein the welding machine has a precision high-power laser.

10. Transfer apparatus according to claim 4 including a welding carriage.

11. Transfer apparatus according to claim 5 including a welding carriage.

12. Transfer apparatus according to claim 4 including at least two shuttles.

13. Transfer apparatus according to claim 5 including at least two shuttles.

* * * * *